United States Patent
Cronin et al.

(10) Patent No.: US 8,151,202 B1
(45) Date of Patent: Apr. 3, 2012

(54) PROVIDING A WORKFLOW GUIDE

(75) Inventors: David M. Cronin, San Francisco, CA (US); Douglas S. LeMoine, San Francisco, CA (US); Nathan J. Fortin, Alameda, CA (US)

(73) Assignee: Teradata US, Inc., Dayton, OH (US)

( * ) Notice: Subject to any disclaimer, the term of this patent is extended or adjusted under 35 U.S.C. 154(b) by 1087 days.

(21) Appl. No.: 11/999,436

(22) Filed: Dec. 5, 2007

(51) Int. Cl.
G06F 3/048 (2006.01)
G06F 3/00 (2006.01)

(52) U.S. Cl. ......... 715/764; 715/704; 715/853; 715/967

(58) Field of Classification Search ................ 715/704, 715/764, 784, 853, 967
See application file for complete search history.

(56) References Cited

U.S. PATENT DOCUMENTS

| | | | | |
|---|---|---|---|---|
| 5,517,663 A | * | 5/1996 | Kahn | 345/473 |
| 5,818,715 A | * | 10/1998 | Marshall et al. | 705/8 |
| 5,890,133 A | * | 3/1999 | Ernst | 705/7 |
| 6,003,011 A | * | 12/1999 | Sarin et al. | 705/9 |
| 6,243,615 B1 | * | 6/2001 | Neway et al. | 700/108 |
| 6,295,061 B1 | * | 9/2001 | Park et al. | 715/764 |
| 6,535,907 B1 | * | 3/2003 | Hachiya et al. | 709/202 |
| 6,990,636 B2 | * | 1/2006 | Beauchamp et al. | 715/764 |
| 7,114,037 B2 | * | 9/2006 | Agarwal et al. | 711/143 |
| 7,168,077 B2 | * | 1/2007 | Kim et al. | 718/106 |
| 7,581,011 B2 | * | 8/2009 | Teng | 709/229 |
| 7,653,566 B2 | * | 1/2010 | Kim et al. | 705/9 |
| 7,802,174 B2 | * | 9/2010 | Teng et al. | 715/200 |
| 2002/0075293 A1 | * | 6/2002 | Charisius et al. | 345/704 |
| 2002/0138577 A1 | * | 9/2002 | Teng et al. | 709/205 |
| 2003/0197733 A1 | * | 10/2003 | Beauchamp et al. | 345/764 |
| 2005/0257136 A1 | * | 11/2005 | Charisius et al. | 715/511 |

* cited by examiner

Primary Examiner — Nicholas Augustine
(74) Attorney, Agent, or Firm — Trop, Pruner & Hu P.C.

(57) ABSTRACT

A user request is received for a workflow guide that pertains to a workflow involving tasks of multiple applications that cooperate with database management software. In response to receiving the indication, the workflow guide is presented for display, where the workflow guide provides information regarding tasks associated with the multiple applications involved in the workflow. Interactive selections made by a user in the displayed workflow guide are received to cause further information to be retrieved.

20 Claims, 5 Drawing Sheets

PROVIDING A WORKFLOW GUIDE

BACKGROUND

Relational database management systems are widely used to store data and to allow access of the data. As database management systems have become more sophisticated, greater flexibility is afforded to users of the database management system. Traditionally, an application associated with the database management system is operated and managed at a customer site by a relatively restricted set of users with considerable product expertise. As a result, the users of the application are generally familiar with the application.

However, to enhance flexibility, some database management systems are transitioning to an architecture in which multiple applications can be provided to provide various support functions. Also, it is expected that a wider range of users would have access to the various applications. It is likely that many of the users would not be familiar with some or all of the applications that they may use, which poses an issue associated with training these users to effectively use the applications. Online help guides are typically associated with individual applications such that when a user goes to an online help guide, information pertaining to one application is typically provided. Thus, for a user to effectively use multiple applications, the user would have to access multiple online help guides, which can be a time-consuming and ineffective way of learning how to use the applications.

SUMMARY

In general, a workflow guide provides information relating to tasks associated with plural applications involved in a particular workflow. The workflow guide can be output in response to user selection of one of plural items that represent corresponding different workflows.

Other or alternative features will become apparent from the following description, from the drawings, and from the claims.

DETAILED DESCRIPTION

Figure 1:
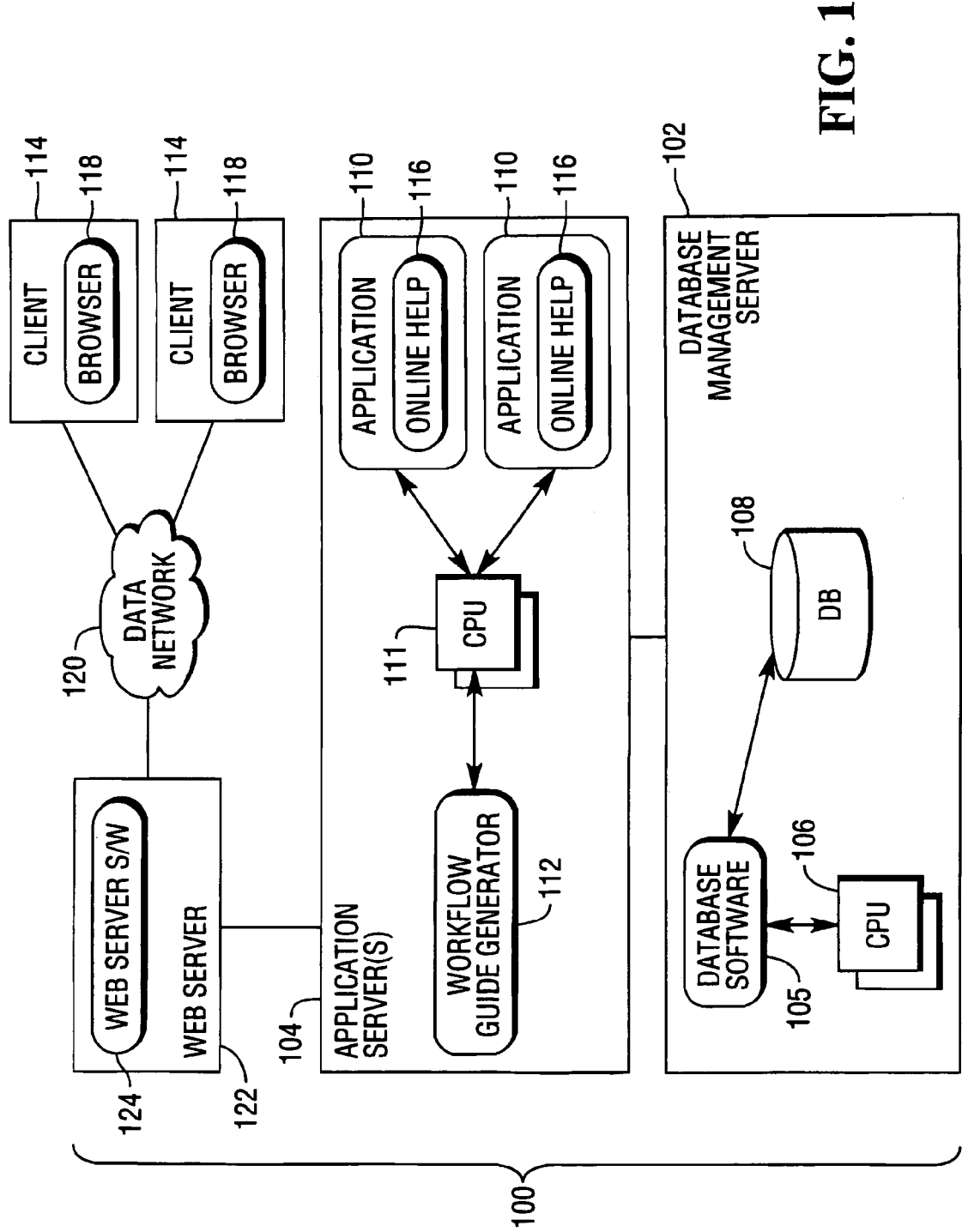
FIG. 1 is a block diagram of an example arrangement that includes a database management system and associated software applications that are accessible by a user.

To provide more effective guide information to users, workflow guides according to some embodiments can be provided by a workflow guide generator for various workflows that involve tasks performed by multiple software applications, where the software applications can be associated with a database management system. The software applications are "associated" with the database management system in that the software applications cooperate with software, such as database management software, of the database management system. Similarly, a workflow is considered to be "associated" with the database management system if the workflow involves tasks performed by software applications that cooperate with software of the database management system.

By providing information relating to tasks of multiple applications, a workflow guide can guide a user through steps associated with a target workflow that involves multiple applications. In this way, a user is able to use the workflow guide to easily step through tasks associated with applications that the user may not be familiar with. The workflow guide provides sufficient information about the workflow such that the user does not have to first invoke online help guides associated with individual applications. The workflow guide explains the overall workflow in terms that a user can easily understand, which in turn may encourage the user to further explore the application components that the user may be initially unfamiliar with. Note that the workflow guide is intended to complement online help guides, which generally provide detailed explanations of low-level controls, actions, and terminology.

Online help guides associated with individual applications are generally difficult to use for users who are unfamiliar with one or all of the applications involved in a workflow, and who may not know where to start to perform a particular workflow. Generally, separate online help guides for separate applications typically require a user to understand the system architecture before the user is able to get the user's work done. For example, if the user can only rely on online help guides associated with individual applications, then the user would have to perform free-text search on topics that are associated with the workflow in each of the online help guides in the user's attempt to try to understand the overall architecture as well as the individual applications. In response to the search, the online help guides may present many search results that the user would then have to read through to find relevant information. Going through individual online help guides is a time-consuming and inefficient process for users who wish to obtain more global (higher-level) information relating to steps to take with respect to a particular workflow.

A "workflow" generally refers to a collection or sequence of tasks associated with a particular objective. The tasks can involve multiple applications, such as applications associated with a database management system. One example workflow is a workflow to perform profitability scoring to build segmentation criteria for a marketing campaign, such that a customer base can be segmented into multiple market segments. To perform such a workflow, two applications may have to be invoked, where one application is invoked to perform segmentation, and another application is invoked to perform profitability scoring. Rather than having to rely upon online help guides of the individual applications to determine how to perform profitability scoring to build the segmentation criteria for a marketing campaign, the workflow guide generator according to some embodiments can be invoked instead, such that a workflow guide is provided to obtain information associated with tasks of the applications that are involved in performing the workflow. Effectively, the workflow guide is able to dissolve barriers between application tools to allow a user to make use of such tools whose functionality and utility were previously unknown to the user.

In one embodiment, a workflow guide menu can be provided to display a list of workflow guides (for different workflows) that are available to a user. A user can select one of the workflow guides to cause retrieval of the workflow guide for presentation, such as in a display. Instead of selecting from a list of workflow guides, an alternative implementation can use a search feature to allow a user to search for relevant workflow guides associated with a desired workflow.

The workflow guide that is presented is an interactive workflow guide that allows the user to navigate through various tasks associated with the workflow. Links can be provided in the workflow guide to allow the user to link to more detailed information, such as links to online help guides of individual applications. The workflow guide can be considered a filter through which a user can identify the most directly relevant domains in the user's knowledge search, so that the user can concentrate on the more relevant tasks. The workflow guide does not assume that a user understands how to get to a starting point. Instead, the workflow guide can escort the user to the subject matter by furnishing scope and context prior to drilling down into actual steps. The emphasis of the workflow guide is on the big picture; as a result, a workflow guide will frequently refer the user to a procedure rather than exposing every detail associated with the procedure.

By employing workflow guides according to some embodiments, a user can easily learn how to perform various workflows. In fact, a user can change focus during multiple workflows that involve different combinations of applications even though the user may not be familiar with some or all of the applications. In this manner, a user can sample different workflows that may be available in a menu (such as a menu associated with a database management system) without having to master each of the functions.

FIG. 1 illustrates an example arrangement that includes a platform 100 that includes a database management server 102, one or more application servers 104, and optionally one or more web servers 122. The term "server" refers to a server computer on which software, such as application software or database management software, can be loaded for execution. The platform 100 can be a distributed platform implemented with multiple servers provided at one location or distributed across multiple locations. In an alternative implementation, the platform 100 can be implemented in a more integrated computer system, such as a massively parallel processing system.

As depicted in the example arrangement of FIG. 1, the database management server 102 includes database management software 105 that is executable on one or more central processing units (CPUs) 106 of the database management server. The database management software 105 manages access of data contained in a database 108 that is stored in a storage subsystem of the database management server. For a large system, the database 108 can be distributed across multiple storage modules that can be accessed in parallel to enable faster access of data. The database management software 105 can include multiple access modules that are able to access data in corresponding storage modules in parallel. An example of the database software 105 that can be employed is the TERADATA® database management software from Teradata Corporation.

The application server(s) 104 include(s) software applications 110 that are executable in CPU(s) 111 to perform various tasks in cooperation with the database management software 105. Instead of running the software applications 110 on the application server(s) 104, the software applications 110 can be run on the database management server 102.

In accordance with some embodiments, a workflow guide generator 112 is provided to allow a user to retrieve workflow guides associated with various workflows that involve tasks performed by the software applications 110. In the FIG. 1 example, the workflow guide generator 112 is implemented on the application server(s) 104. In a different implementation, the workflow guide generator 112 can be implemented on a separate server (e.g., the database management server 102), or even at a client computer, such as one of client computers 114 depicted in FIG. 1. The workflow guide generator 112 is accessible by a user at the client computers 114 to allow a user to retrieve a desired workflow guide.

As further depicted in the example of FIG. 1, each individual software application 110 is associated with an online help guide 116 associated with the respective individual application. The online help guide 116 can be a traditional help guide to allow a user to search for detailed information about the corresponding individual application 110.

As further depicted in the example of FIG. 1, each client computer 114 includes a browser 118, such as a web browser or other type of user interface software. The browser 118 is used by the user of the client 114 to access resources available on the application server(s) 104 and the database management server 102. The client computers 114 are connected over a data network 120 to the web server 122, on which web server software 124 is executable. In an alternative implementation, the web server 122 can be omitted, with the client computers 114 being enabled to access the application server (s) 104 or the database management server 102 directly.

In accordance with some embodiments, a browser 118 can be used to select, or search for, a workflow guide that can guide a user through the various tasks of a target workflow. The browser 118 can also be used to display various graphical user interface (GUI) control items (e.g., menus, buttons, etc.) and screens associated with the workflow guide generator 112.

Figure 2:
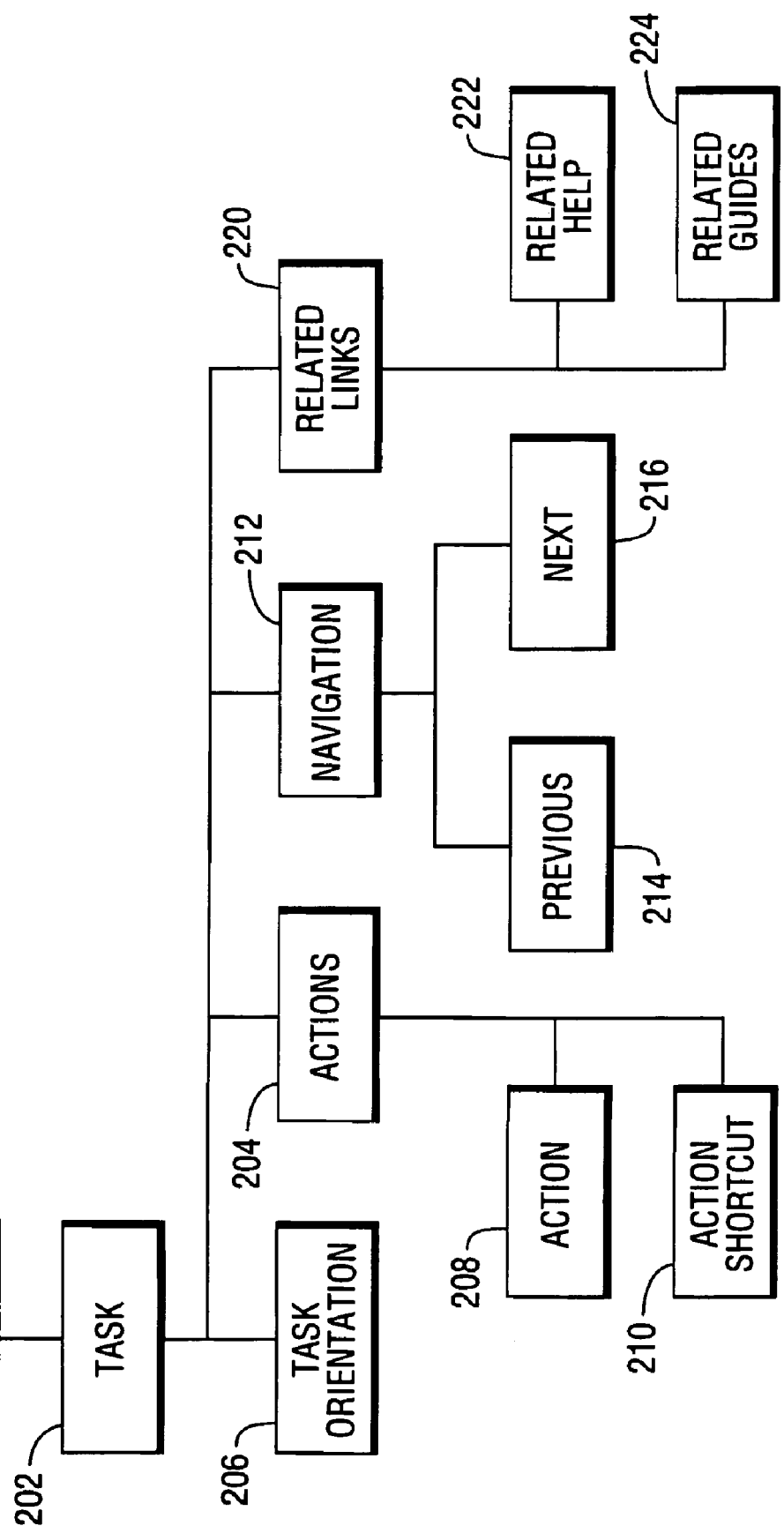
FIG. 2 illustrates a workflow guide architecture according to an embodiment.

An example architecture of a workflow guide is depicted in FIG. 2. Each workflow guide is organized around a single workflow, represented by workflow element 200, that is broken down into general tasks represented by task elements 202 (only one shown in FIG. 2), and accompanying specific actions 204.

The workflow element 200 is identified by a title, such as "Create New Segment." The task element 202 is identified by a task title. A task orientation element 206 of the workguide architecture depicted in FIG. 2 is a short instruction that provides a screen context and preface, such as a tip or a simple directive related to the task. In some cases, the task orientation element 206 provides conceptual information, such as: "To define a segment, first add a segment object to the work space."

The actions element 204 specifies actions to perform in an interface to accomplish a corresponding task. An action may include multiple steps or choices that subsequently fork to other actions. An example action can be: "Click on the Add New button in the workspace toolbar and select Segment." Underneath the actions element 204 are one or more actions 208 and optional shortcuts 210 to actions. The shortcuts 210 can be links to the actions to be taken.

Another element of the workflow guide architecture is a navigation element 212, where the navigation element 212 provides links to previous or next actions or tasks (214 and 216, respectively). The navigation element 212 enables the user to step through actions associated with the workflow.

Another element is a related links element 220, where the related links element 220 can include sub-elements including related help 222 (to jump to relevant online help guides or other information) or a related workflow guide 224 (to jump to workflow guides that are related to the subject workflow).

In one example embodiment, a workflow guide provides instructional assistance to a user for three major categories of workflows: adding new objects, editing existing objects, and viewing reports and results. Since the actual work of adding and editing each given object may involve many more steps than can logically be covered within a single procedure, a workflow guide calls out the high-level tasks and then groups the associated actions where possible to reduce the need for immediate detailed explanation. As a result, by paging through a workflow guide, the reader can more quickly grasp the basic concepts than if the reader were to read through each step of each procedure required to fully cover the workflow.

Figure 3:
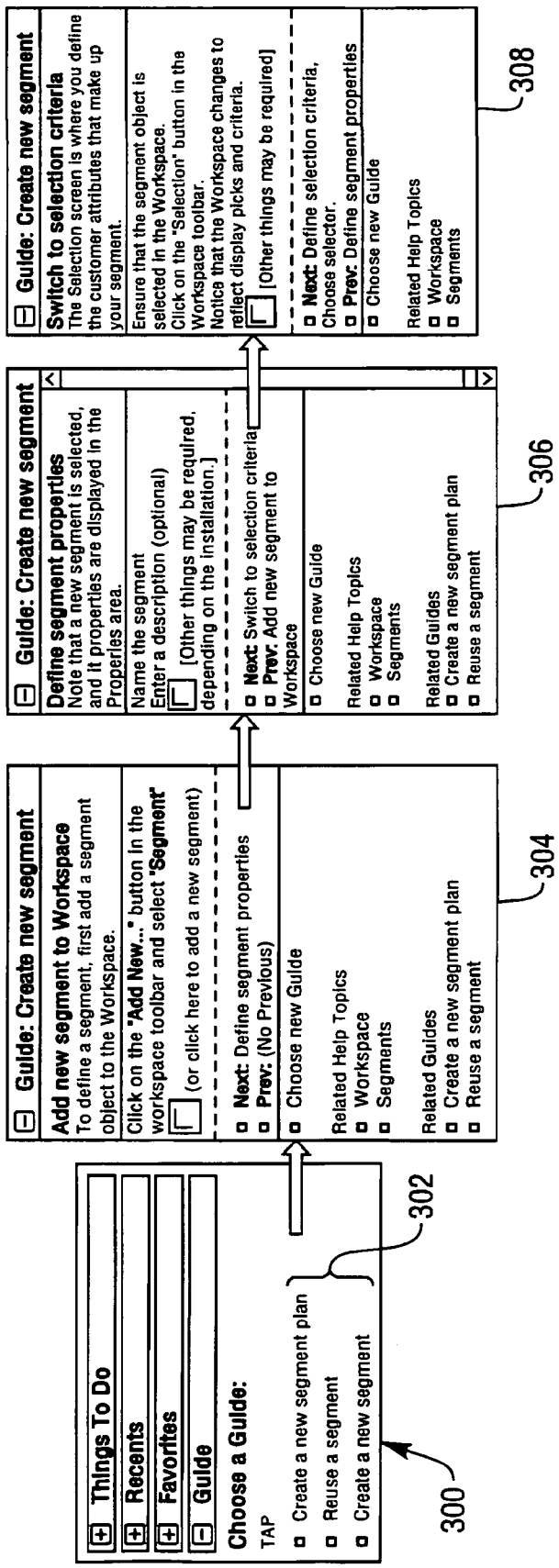
FIGS. 3 and 4 illustrate example screens associated with an example workflow guide, according to an embodiment.

As depicted in an example depicted in FIG. 3, a workflow guide window 300 (displayed in a GUI screen) appears in list mode when no workflow guide has been selected. In list mode, available workflow guides are displayed in a list 302. If an object has been selected in the workspace, the workflow guide for that object will be displayed at the top of the list. In one implementation where the workflow guide does not offer search capability, the user can conduct free-text searches with online help guides of individual applications. In such an implementation, the online help guides provide more exhaustive sources of information than the workflow guide. However, note in a different implementation, a search capability can be incorporated into the workflow guide.

In some implementations, it is possible to save the state of a workflow guide when a user has to temporarily interrupt or exit the user's work. Thus, when a user returns to the workflow guide, the user can go back to the state of the workflow guide at the point that the user interrupted his or her work.

In some cases, an enterprise (such as a company, government agency, or educational organization) can, at installation, configure the workflow guide generator to display custom guides that reflect internal processes of the enterprise for various custom workflows. These custom workflow guides can help enforce best practices among users of the enterprise.

Figure 4:
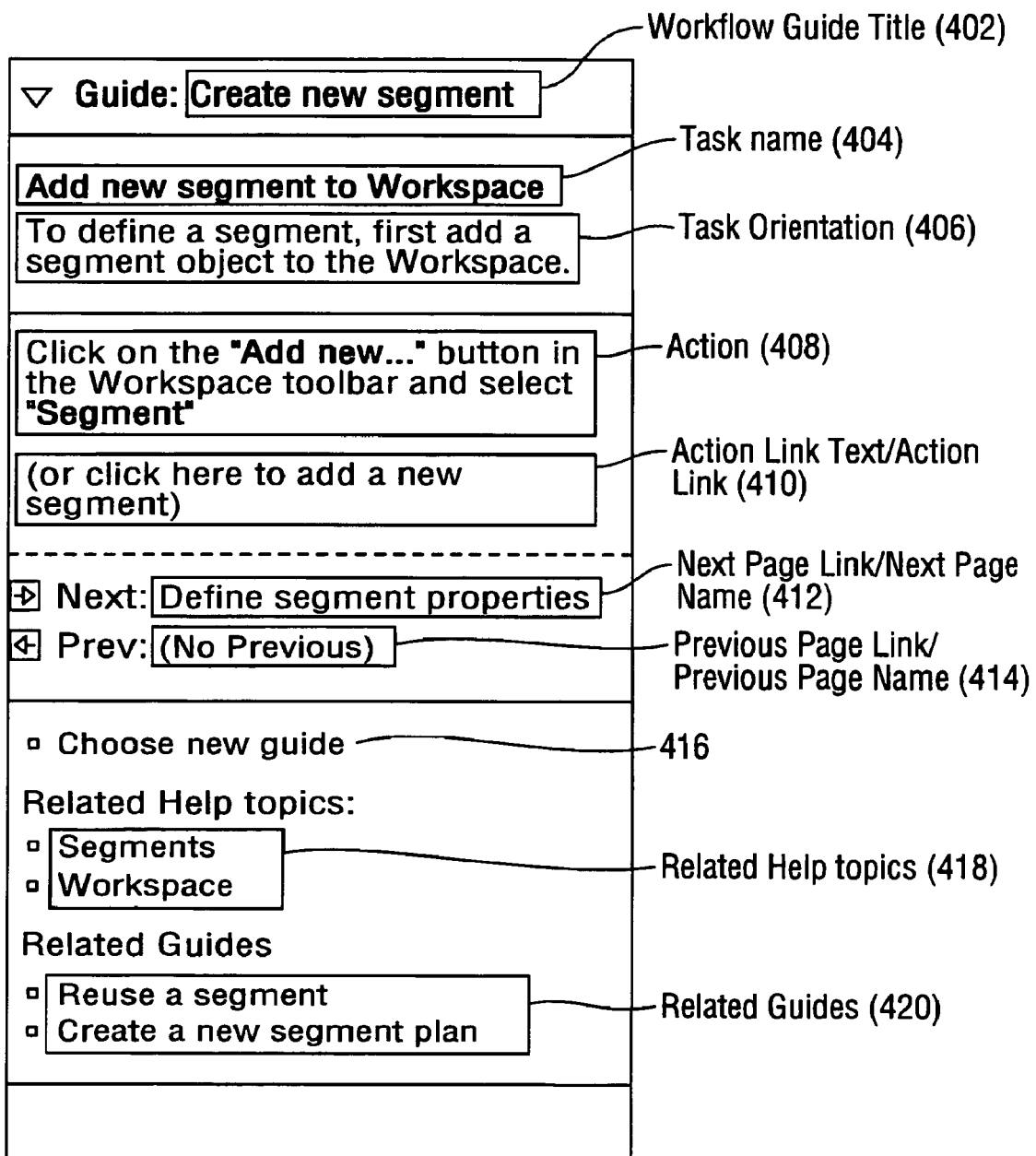

As further depicted in the example of FIG. 3, the "Create New Segment" workflow guide has been selected in the list 302 presented in the workflow guide window 300. Selection of the "Create New Segment" item causes a screen 304 containing the "Create new segment" workflow guide to be displayed. FIG. 4 shows the "Create New Segment" workflow guide in more detail. The top of the screen 304 has the workflow guide title (402). Below the workflow guide title 402 is a task name 404, in this example "Add a New Segment to Workspace." A task orientation 406 is provided below the task name 404.

An action 408 is also provided in the screen 304 underneath the task information 404, 406. A link (410) is also provided to allow the user to link to a particular action. Clicking on the action link 410 causes the particular action to be performed, where the action is the action 408 specified in the screen 304. The action link 410 enhances convenience since the user does not have to manually go to the correct menu item of the appropriate control screen to perform the action specified in 408.

Navigation buttons 412 and 424 are provided to allow the user to link to next or previous actions.

The screen 304 also includes a "Choose New Guide" item 416 to allow a user to choose a new workflow guide if the user determines that the present workflow guide has not served the purpose of the user. Related help topics 418 are also listed in the screen 304 to allow the user to access more detailed online help guides associated with corresponding applications. Also, a related workflow guides section 420 allows a user to link to related workflow guides of other workflows.

As further depicted in FIG. 3, it is assumed that the user has clicked on the "Next" link 412 in the screen 304, which in this example corresponds to the "Define Segment Properties" action. This selection causes another screen 306 to be displayed for the next task, in this case "Define Segment Properties." FIG. 3 also shows that another screen 308 has been displayed in response to selection of the "Next" navigation element in the screen 306, which corresponds to the "Switch to Selection Criteria" task.

Instead of displaying individual screens for individual tasks one by one, it is noted that the workflow guide window can display multiple tasks at the same time. By using workflow guides in accordance with some embodiments, the user does not even have to know which application to start out with to perform a particular workflow. The user can easily navigate through specific tasks to be taken with respect to a particular workflow without having to be exposed to extraneous information that may be confusing to a user not familiar with particular applications.

Figure 5:
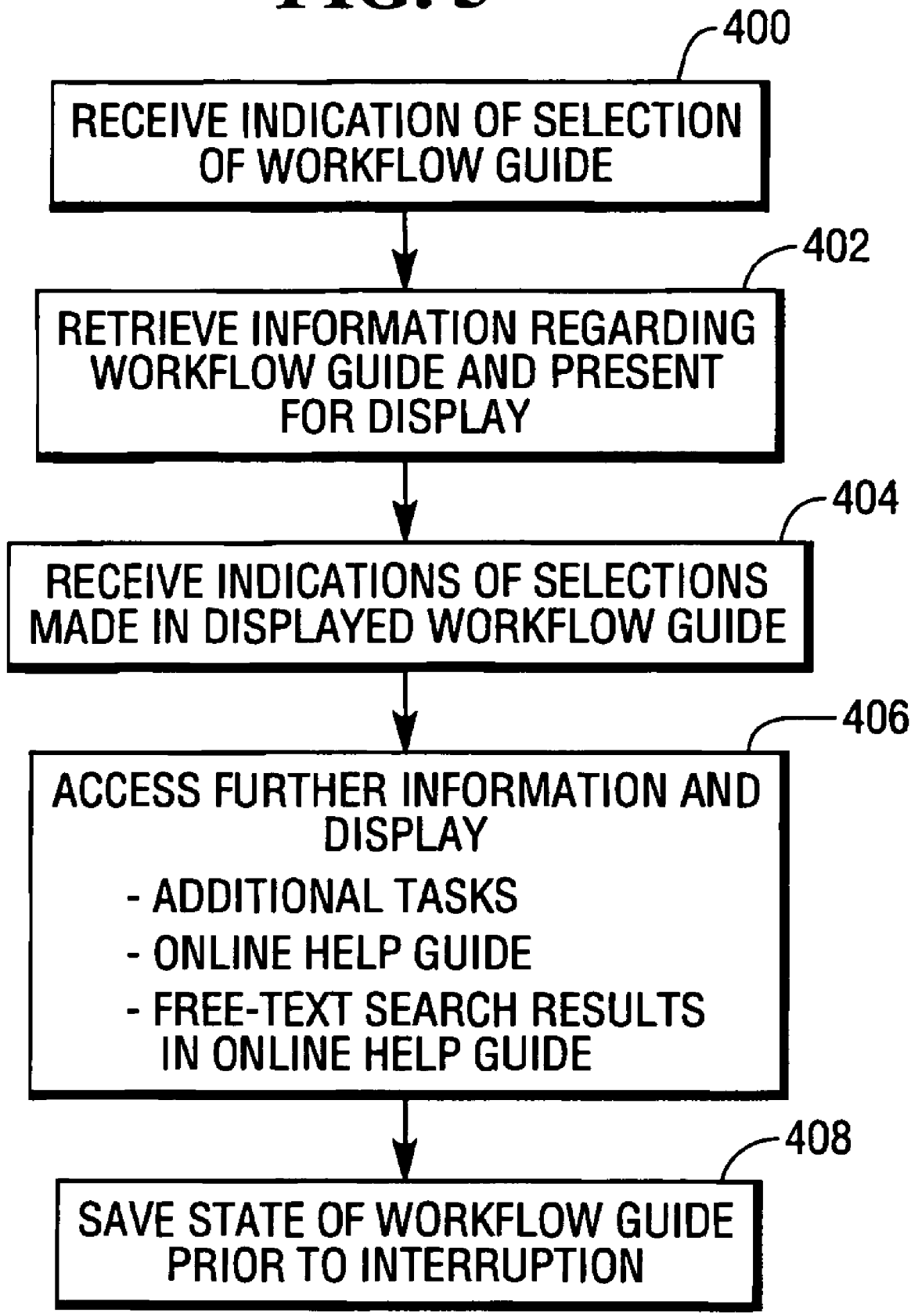
FIG. 5 is a flow diagram of a process of providing a workflow guide according to an embodiment.

FIG. 5 shows a general flow diagram of a process performed according to some embodiments. The process can be performed by the workflow guide generator as well as by other software routines or modules. An indication of selection of a workflow guide is received (at 400), where the selection can be made from a list of workflow guides, or where the selection can be based on a search for a workflow guide. In response to the received indication, information regarding that workflow guide is retrieved (at 402) and presented for display. Indications of interactive selections made in the displayed workflow guide are received (at 404). The interactive selections cause further information to be accessed and displayed (at 406). The further information can include additional tasks of the workflow guide, an online help guide, and results of free-text search in the online help guide.

At some point, a user may wish to exit the workflow guide. However, in accordance with some embodiments, the state of the workflow guide can be saved (at 408) so that the user can return to the saved state of the workflow guide later.

The various tasks discussed above can be performed by software. Instructions of such software are loaded for execution on a processor (such as CPUs 106 and 111 in FIG. 1. The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method for use with a database management system having plural software applications, comprising:

providing user-selectable items representing different workflows that are associated with the database management system;

in response to receipt of an indication of a particular one of the items, retrieving, by a system having a processor, a first workflow guide relating to a particular workflow associated with the particular item, wherein the first workflow guide provides information regarding tasks associated with plural software applications involved in the particular workflow, wherein each of multiple ones of the plural software applications is associated with a corresponding individual online help guide;

output, by the system, the retrieved first workflow guide for presentation to a user;

receiving, by the system, indications of selections made by the user in the presented first workflow guide;

accessing, by the system, at least one of the individual online help guides in response to one or more of the indications of selections in the presented first workflow guide;

receiving, by the system, a selection of a link in the presented first workflow guide; and accessing a second workflow guide in response to the selection of the link.

2. The method of claim 1, wherein receiving the indications of selections comprises receiving indications of selections of navigation elements related to previous and next tasks in the particular workflow.

3. The method of claim 2, further comprising:
presenting the accessed at least one individual online help guide; and
in response to receiving indications of selections of elements in the presented at least one individual online help guide, accessing additional information.

4. The method of claim 1, wherein accessing the at least one individual online help guide comprises accessing plural online help guides associated with corresponding ones of the plural software applications.

5. The method of claim 1, wherein retrieving the first workflow guide comprises retrieving the first workflow guide that provides information regarding tasks associated with the plural software applications that cooperate with database management software to perform the particular workflow.

6. The method of claim 1, further comprising saving a state of the first workflow guide prior to interrupting the first workflow guide such that a user can return to the saved state of the first workflow guide at a later time.

7. The method of claim 1, wherein retrieving the first workflow guide comprises retrieving the first workflow guide that provides information regarding actions associated with the tasks.

8. The method of claim 7, wherein retrieving the first workflow guide comprises retrieving the first workflow guide that has navigation links to allow a user to step to previous and next actions of the particular workflow.

9. An article comprising at least one computer-readable storage medium that contains instructions that when executed cause a computer to:
receive an indication of a user request for a first workflow guide that pertains to a workflow involving tasks of multiple applications that cooperate with database management software, wherein each of plural ones of the multiple applications is associated with a corresponding individual online help guide;
in response to receiving the indication, present the first workflow guide for display, wherein the first workflow guide provides information regarding tasks associated with the multiple applications involved in the workflow;
receive interactive selections made by a user in the displayed first workflow guide to cause further information to be retrieved, wherein the further information includes at least one of the individual online help guides;
receive a selection of a link in the displayed first workflow guide; and
access a second workflow guide in response to the selection of the link.

10. The article of claim 9, wherein retrieving the further information further comprises stepping to another task in the first workflow guide.

11. The article of claim 9, wherein the at least one individual online help guide is separate from the first workflow guide.

12. The article of claim 11, wherein the instructions when executed cause the computer to further receive a free-text search request to obtain additional information from the at least one individual online help guide.

13. The article of claim 11, wherein the first workflow guide provides higher-level information than the at least one individual online help guide.

14. A computer comprising:
a processor; and
a workflow guide generator executable on the processor to:
receive an indication of user selection of a first workflow guide that relates to a workflow involving tasks of plural applications that cooperate with database management software executable in a database management system, wherein each of multiple ones of the plural applications is associated with a corresponding individual online help guide;
display the first workflow guide, wherein the first workflow guide provides information regarding tasks associated with the plural applications involved in the workflow;
receive interactive selections made by a user in the display of the first workflow guide to cause further information to be retrieved, wherein the further information includes at least one of the individual online help guides;
receive a selection of a link in the displayed first workflow guide; and
access a second workflow guide in response to the selection of the link.

15. The computer of claim 14, wherein the interactive selections made in the displayed first workflow guide comprise interactive selections of previous and next navigation elements.

16. The computer of claim 14, wherein the interactive selections made in the displayed first workflow guide comprise a selection of an action to be taken.

17. The computer of claim 14, wherein the interactive selections made in the displayed first workflow guide comprise selection of a link to an online help guide of one of the plural applications.

18. The computer of claim 14, wherein the first workflow guide presents information to allow a user to perform tasks of the workflow without having to use online help guides of the plural applications.

19. The method of claim 1, further comprising presenting the user-selectable items in a list in a graphical user interface screen.

20. The article of claim 11, wherein the instructions when executed cause the computer to further:
present user-selectable items representing different workflows in a list in a graphical user interface screen,
wherein receiving the indication is in response to user selection of one of the user-selectable items.

* * * * *